United States Patent [19]

Vu

[11] Patent Number: 5,056,085
[45] Date of Patent: Oct. 8, 1991

[54] FLOOD-AND-FORWARD ROUTING FOR BROADCAST PACKETS IN PACKET SWITCHING NETWORKS

[75] Inventor: Thu V. Vu, West Melbourne, Fla.

[73] Assignee: Harris Corporation, Melbourne, Fla.

[21] Appl. No.: 391,197

[22] Filed: Aug. 9, 1989

[51] Int. Cl.$^5$ .......................................... H04Q 11/04
[52] U.S. Cl. ..................................... 370/60; 370/94.1
[58] Field of Search ..................... 370/60, 60.1, 94.1, 370/94.2, 94.3, 85.13, 85.14

[56] References Cited

U.S. PATENT DOCUMENTS

| 4,399,531 | 8/1983 | Grande et al. | 370/60 |
| 4,905,233 | 2/1990 | Cain et al. | 370/94.1 |

OTHER PUBLICATIONS

*Computer Networks*, by Andrew S. Tananbaum, Prentice Hall, Englewood Cliffs, N.J., 1981.
"Reverse Path Forwarding of Broadcast Packets," Y. K. Dalal and R. M. Metcalf, *Communications of the ACM*, vol. 21, pp. 1040–1048, Dec. 1978.

*Primary Examiner*—Douglas W. Olms
*Assistant Examiner*—Wellington Chin
*Attorney, Agent, or Firm*—Antonelli, Terry, Stout & Kraus

[57] ABSTRACT

A routing algorithm for broadcast packets in packet switching networks, utilizing a "flood-and-forward" technique. In such networks, data are often transmitted in grat quantities from a sensor node to all other nodes in the network, or in a subnetwork, over point-to-point links. Existing broadcast routing algorithms, including multidestination addressing, constrained flooding, minimum spanning tree forwarding, and reverse path forwarding, suffer from an excessive use of bandwidth, a poor choice of routes, or a costly need for memory or computing power. In flood-and-forward routing, periodically a data packet is designated as a Scout packet and is transmitted in a constrained flood broadcast transmission. The Scout packet is identified by a Source Id and a Scout Label. Each receiving node sends a Ack Scout packet to the node from which it first receives a particular Scout packet, acknowledging receipt of that packet. Each relaying node keeps a log of nodes from which it has received Ack Scout packets and sends subsequent, non-scout packets to those same nodes. This flood-and-forward broadcast routing algorithm thus offers the best selection of routes, as in constrained flooding, and the least consumption of bandwidth, as in minimum spanning tree forwarding, while keeping the overhead cost of storage and processing to a low level. With the support of a reliable link service, the algorithm performs well in delivering critical data to all reachable destinations despite to-be-expected losses of packets, links, or nodes.

3 Claims, 10 Drawing Sheets

```
PROCEDURE GENERATE_BROADCAST(DATA_UNIT) IS
BEGIN
    IF (CURRENT_TIME > SCOUT_LAST_SENT_TIME + NON_FLOOD_PERIOD) THEN
        -- IT'S TIME TO SEND A SCOUT PACKET
        GENERATE_FLOOD_BROADCAST(SCOUT_LABEL,DATA_UNIT);
        SCOUT_LAST_SENT_TIME := CURRENT_TIME;
        INCREMENT_SCOUT_LABEL;
    ELSE IF (CURRENT_TIME > ROUTES_LAST_UPDATED_TIME + ROUTES_LIFE) THEN
        -- ROUTES ARE NOT UP TO DATE
        PUT_PACKETS_ON_HOLD(DATA_UNIT);
    ELSE
        -- USE BROADCAST ROUTING TABLES
        GENERATE_NON_FLOOD_BROADCAST(CURRENT_ROUTES,DATA_UNIT);
    END IF;
END GENERATE_BROADCAST;
```

FIG. 4

```
PROCEDURE PROPAGATE_FLOOD_BROADCAST(SCOUT_PACKET,LINK_ARRIVED_ON) IS
BEGIN
    NOT_YET_SEEN := CHECK_CONSTRAINT_TABLE(SCOUT_PACKET);
    IF (NOT_YET_SEEN) THEN
        ACCEPT_AND_LOG_PACKET(SCOUT_PACKET);
        -- FORWARD SCOUT PACKET
        FORWARD_LINKS := ALL_LINKS - LINK_ARRIVED_ON;
        FORWARD_PACKET(SCOUT_PACKET,FORWARD_LINKS);
        -- SET UP MECHANISM FOR EXTRACTING ROUTES FROM SCOUT PACKET
        SOURCE_ID := SCOUT_PACKET.SOURCE_ID;
        SCOUT_LABEL := SCOUT_PACKET.SCOUT_LABEL;
        ACK_SCOUT_TIMER(SOURCE_ID,SCOUT_LABEL) := CURRENT_TIME +
            ACK_SCOUT_PERIOD;
        BROADCAST_ROUTING_TABLE(SOURCE_ID,SCOUT_LABEL).SEND_TO := NULL;
        BROADCAST_ROUTING_TABLE(SOURCE_ID,SCOUT_LABEL).RECEIVED_FROM :=
            LINK_ARRIVED_ON;
        -- SEND ACK SCOUT PACKET
        PREPARE_ACK_SCOUT_PACKET(SOURCE_ID,SCOUT_LABEL,ACK_SCOUT_PACKET);
        FORWARD_LINKS := LINK_ARRIVED_ON;
        FORWARD_PACKET(ACK_SCOUT_PACKET,FORWARD_LINKS);
    END IF;
END PROPAGATE_FLOOD_BROADCAST;
```

FIG. 5

```
PROCEDURE GENERATE_FLOOD_BROADCAST(SCOUT_LABEL,DATA_UNIT) IS
BEGIN
    SOURCE_ID := OWN_ID;
    PREPARE_SCOUT_PACKET(SOURCE_ID,SCOUT_LABEL,DATA_UNIT,SCOUT_PACKET);
    FORWARD_LINKS := ALL_LINKS;
    FORWARD_PACKET(SCOUT_PACKET,FORWARD_LINKS);
    -- SET UP MECHANISM FOR EXTRACTING ROUTES FROM SCOUT PACKET
    ACK_SCOUT_TIMER(SOURCE_ID,SCOUT_LABEL) := CURRENT_TIME +
        ACK_SCOUT_PERIOD;
    BROADCAST_ROUTING_TABLE(SOURCE_ID,SCOUT_LABEL).SEND_TO := NULL;
    TIME_TO_INSTALL_ROUTES := CURRENT_TIME + ACK_SCOUT_PERIOD;
    SCHEDULE_TIME_TO_INSTALL_ROUTES(SCOUT_LABEL);
END GENERATE_FLOOD_BROADCAST;
```

FIG. 6

```
PROCEDURE RECEIVE_ACK_SCOUT(ACK_SCOUT_PACKET,LINK_ARRIVED_ON) IS
BEGIN
    SOURCE_ID := ACK_SCOUT_PACKET.SOURCE_ID;
    SCOUT_LABEL := ACK_SCOUT_PACKET.SCOUT_LABEL;
    IF (CURRENT_TIME <= ACK_SCOUT_TIMER(SOURCE_ID,SCOUT_LABEL)) THEN
        BROADCAST_ROUTING_TABLE(SOURCE_ID,SCOUT_LABEL).SEND_TO :=
            BROADCAST_ROUTING_TABLE(SOURCE_ID,SCOUT_LABEL).SEND_TO +
            LINK_ARRIVED_ON;
    END IF;
END RECEIVE_ACK_SCOUT;
```

FIG. 7

```
PROCEDURE INSTALL_ROUTES_EVENT(SCOUT_LABEL) IS
BEGIN
    CURRENT_ROUTES := SCOUT_LABEL;
    ROUTES_LAST_UPDATED_TIME := CURRENT_TIME;
    -- BROADCAST PACKETS WHICH WERE PUT ON HOLD BECAUSE NO ROUTES
    -- WERE AVAILABLE
    WHILE (MORE_PACKETS_ON_HOLD) LOOP
        RELEASE_PACKETS_ON_HOLD(DATA_UNIT);
        GENERATE_NON_FLOOD_BROADCAST(CURRENT_ROUTES,DATA_UNIT);
    END LOOP;
END INSTALL_ROUTES_EVENT;
```

FIG. 8

```
PROCEDURE GENERATE_NON_FLOOD_BROADCAST(SCOUT_LABEL,DATA_UNIT) IS
BEGIN
    SOURCE_ID := OWN_ID;
    PREPARE_BROADCAST_PACKET(SOURCE_ID,SCOUT_LABEL,DATA_UNIT,PACKET);
    FORWARD_LINKS := BROADCAST_ROUTING_TABLE(SOURCE_ID,
        SCOUT_LABEL).SEND_TO;
    FORWARD_PACKET(PACKET,FORWARD_LINKS);
END GENERATE_NON_FLOOD_BROADCAST;
```

FIG. 9

```
PROCEDURE PROPAGATE_NON_FLOOD_BROADCAST(PACKET,LINK_ARRIVED_ON) IS
BEGIN
    SOURCE_ID := PACKET.SOURCE_ID;
    SCOUT_LABEL := PACKET.SCOUT_LABEL;
    IF (BROADCAST_ROUTING_TABLE(SOURCE_ID,SCOUT_LABEL).RECEIVED_FROM =
    LINK_ARRIVED_ON) THEN
        ACCEPT_PACKET(PACKET);
        FORWARD_LINKS := BROADCAST_ROUTING_TABLE(SOURCE_ID,
            SCOUT_LABEL).SEND_TO;
        FORWARD_PACKET(PACKET,FORWARD_LINKS);
    END IF;
END PROPAGATE_NON_FLOOD_BROADCAST;
```

FIG. 10

FLOOD-AND-FORWARD ROUTING FOR BROADCAST PACKETS IN PACKET SWITCHING NETWORKS

This invention was made with United States government support under contract No. F30602-86-C-0224. The United States government has certain rights in this invention.

BACKGROUND OF THE INVENTION

Communication between distant stations or nodes, for example communication between nodes in a satellite network orbiting the earth, presents many requirements that have not previously been encountered in communication or computer networks. Most such communication networks are expected to be based in space and to consist of thousands of satellites orbiting the earth at various altitudes and inclinations. Such satellites are constantly moving in and out of line of sight of each other and, when engaged in a battle, are subject to all kinds of threats, ranging from link jamming to total destruction. The dynamic and volatile nature of such networks poses a great challenge to network management, requiring techniques that adapt to topological changes and that can survive threats.

In some situations, it may be desired to transmit a packet of data from one node to one specific other node. Such transmissions are referred to as "point-to-point". In other situations, it may be desired to send data from a sensor node in the network to all other nodes in the network, or to all the nodes in a subnetwork of the network. By way of illustration, in a defensive military environment, a subnetwork of sensor nodes may be in high earth orbits, as depicted in FIG. 1, while a subnetwork of weapon nodes may be in low earth orbits, as depicted in FIG. 2. It may be necessary to broadcast a packet of data from a sensor node in the high earth orbit to every weapon node in the low earth orbit. Such a transmission from one node to every node of a subnetwork rather than to a specific one or few of those nodes, is referred to as a "broadcast"; i.e., a transmission from the one node that is "broadcast" to all those other nodes. In the following description, then, "broadcast" refers to such a transmission from one node intended for all of a network or subnetwork of nodes.

In a broadcast mode, packets of data can be guided by a broadcast routing algorithm installed at each node to relay the data packets from node to node over point-to-point links so as to be received by all nodes that are reachable from the source node. This mode of broadcasting has been done before in military or commercial packet switching networks. However, in some defense scenarios, data generated by all the sensor sources can total hundreds of thousands of packets per second. Assured broadcasting of such a quantity of data requires that, in addition to being adaptive and survivable, the broadcast routing algorithm be able to handle a very high traffic load without exacting a heavy toll from the network resources.

There are many existing algorithms for routing broadcast packets in a packet switching network; however, none has been found which offers a satisfactory combination of good performance and low cost. Some algorithms excel in the selection of least delay routes at the expense of bandwidth memory, or computing power. Others sacrifice routing optimality for low overhead cost. Previous work on broadcast routing algorithms is described, for example, in *Computer Networks*, by A. S. Tanenbaum, Prentice Hall, Englewood Cliffs, N.J., 1981, and in "Reverse Path Forwarding of Broadcast Packets," by Y. K. Dalal and R. M. Metcalfe, *Communications of the ACM*, Vol. 21, pp. 1040-1048, December 1978.

One such existing algorithm is known as separate destination addressing. If the network is already equipped with a point-to-point routing algorithm, the obvious approach to broadcast routing is to have the source generate a copy of the broadcast packet for each destination and then to use point-to-point routing to deliver each copy. This approach makes good use of existing hardware; however, since routes to different destinations often overlap, most relaying nodes will receive, process and transmit the same packet over and over again. The abundance of duplicates represents a waste of bandwidth and is likely to create a high level of congestion, especially in areas close to the source.

Another approach to broadcast routing is to carry multiple destination addresses with each packet. When a broadcast packet is generated or received at a node, it partitions the remaining list of destinations, grouping together destinations that map to the same outgoing link in its point-to-point routing table. For each such group the node generates a copy of the broadcast packet, attaches the group's destination list, and forwards the packet on the selected outgoing link. As the broadcast propagates farther away from the source, the destination list gets smaller until there is no destination remaining. The packets follow the branches of a spanning tree rooted at the source, although information on the spanning tree is not explicitly stored at each node.

Forwarding broadcast packets along branches of a spanning tree has the advantage of generating an optimal number of packet copies; this number is exactly equal to the number of reachable destinations. However, the disadvantage of multidestination addressing lies in the long destination field. A bit map implementation requires as many bits as there are nodes. For networks with thousands of nodes, the high ratio of overhead bits to data bits is a drawback that is not easy to overcome. Furthermore, the performance of this algorithm is tied to that of the underlying point-to-point routing algorithm. If the point-to-point routes are inconsistent, unstable or slow to adapt, the same effects will be exhibited in the broadcast routes.

Constrained flooding is a technique in which an arriving packet that has not been seen before is copied and forwarded on all outgoing links except the link on which it arrived. Packets that have been seen are simply discarded. To keep track of already seen packets, a sequence number is assigned to each packet by the source node, and a constraint table or bit map is maintained at each node to log received packets. The log for a particular packet has to remain in the constraint table for some time, at least for the duration of the broadcast, before the log can be cleared and reused. The size of the constraint table is thus proportional to this predefined time for packets to live, the maximum traffic generation rate by all sources, and the total number of sources. For the architecture of a large network, the constraint table can take up a large chunk of memory. Estimates of millions of bits are not too exaggerated. On top of this hefty memory requirement, constrained flooding also generates a large number of packet copies—$(N)(L-1)+1$ copies, where N is the number of nodes in the network and L is the number of links per node.

As for advantages, constrained flooding is most noted for its robustness. Packet copies that seem to be such a waste at first glance are much needed to replace lost copies. In a simulation of a 300-node network, the algorithm delivered packets to 99.83% of the destination nodes in spite of a 10% packet error rate. Constrained flooding is also known for its selection of best routes. The algorithm always finds the shortest routes possible, and its routes adapt instantaneously to changes in the network.

The least consumption of bandwidth in broadcasting is achieved with minimum spanning tree forwarding, in which packets are forwarded along branches of a spanning tree stored explicitly at each node. If the spinning tree has shortest paths from the source of the broadcast to all destinations, delay is also minimized. The biggest problem in minimum spanning tree forwarding is in determining how the nodes in the network are to generate and maintain such a tree for each source.

One accepted solution is to allow each node access to a global topology database. Every node generates and receives frequent topology updates which include not only changes in the topology but also changes in the link metric. From the information contained in its local copy of the database, each node uses the Dijkstra's shortest path first algorithm to independently compute minimum spanning trees, each one rooted at a different source. This algorithm is discussed in the above-cited article by Dalal and Metcalfe. This computation has a complexity in the order of $(SN^2)$ operations, where S is the number of sources, and N the number of nodes in the network. For thousands of nodes and hundreds of sources, the amount of computation required in this approach is quite demanding. Moreover, keeping the distributed database consistent and up to date is not an easy task in a hostile environment. The success or failure of this task has a tremendous effect on the quality of the routes computed.

If outgoing links for any destination are taken from every point-to-point routing table in the network and joined together, they form a spanning tree from all nodes to the chosen destination. This fact is cleverly exploited in reverse path forwarding. A node forwards a received broadcast packet on all links except the incoming link if and only if the incoming link is the same link the node would use to send an addressed packet back to the source of the broadcast. Thus, this broadcast routing algorithm also makes use of a spanning tree, but this time the tree has shortest reverse paths; i.e., paths from the destinations to the source.

This approach has both advantages and disadvantages. The principal advantage is that there is no need to compute trees since tree branches are readily available in point-to-point routing tables. The major disadvantage is that the trees are inverted, implying that they may not yield shortest paths from the source to the destinations. Also, links must be flooded with packet copies in the hope that neighbors that are not part of the tree will stop the flood, although this undesirable situation can be corrected by having neighbors exchange their routing tables.

SUMMARY OF THE INVENTION

The present invention is a broadcast routing algorithm that closely matches the delay performance of constrained flooding and that provides optimal bandwidth use of minimum spanning tree forwarding, yet that requires only a small amount of memory and computation. Achievement of these seemingly conflicting objectives is possible because of the following fact. As shown in three dimensions in FIG. 3a, and more clearly in a flat projection in FIG. 3b, routes taken by packets of a constrained flood constitute a minimum spanning tree from the source of the broadcast to all reachable destinations. Therefore, constrained flooding provides a fast and inexpensive means to generate a tree of shortest broadcast paths. Advantage is taken of this fact by combining with it a mechanism allowing each node to capture its individual segment of the spanning tree and to use it for forwarding of broadcast packets.

Accordingly, the flood-and-forward routing algorithm of the present invention involves periodically sending out a broadcast packet in a constrained flood broadcast. Each receiving node, the general configuration of which is depicted in FIG. 17, determines whether it has previously seen that broadcast packet. If so, it discards the packet. If not, it sends an acknowledgement of receipt of the packet back to the node that transmitted the packet to it and transmits the broadcast packet to further nodes in accordance with the constrained flood broadcast. Each node records in a broadcast routing table the other nodes from which that node receives an acknowledgement and transmits, or forwards, further broadcast packets to those same nodes until new routes are determined by the next constrained flood packet.

With its two phases, i.e. the constrained flood packet and the regular broadcast packets, this flood-and-forward routing adroitly combines constrained flooding and minimum spanning tree forwarding to provide the advantages, but not the shortcomings, of both routing algorithms.

BRIEF DESCRIPTION OF THE DRAWINGS

These and other aspects and advantages of the present invention are more apparent from the following detailed description and claims, particularly when considered in conjunction with the accompanying drawings, in which:

FIGS. 4-10 present the program design language for various of the algorithms utilized in the present invention;

DETAILED DESCRIPTION OF A PREFERRED EMBODIMENT

Figure 1:
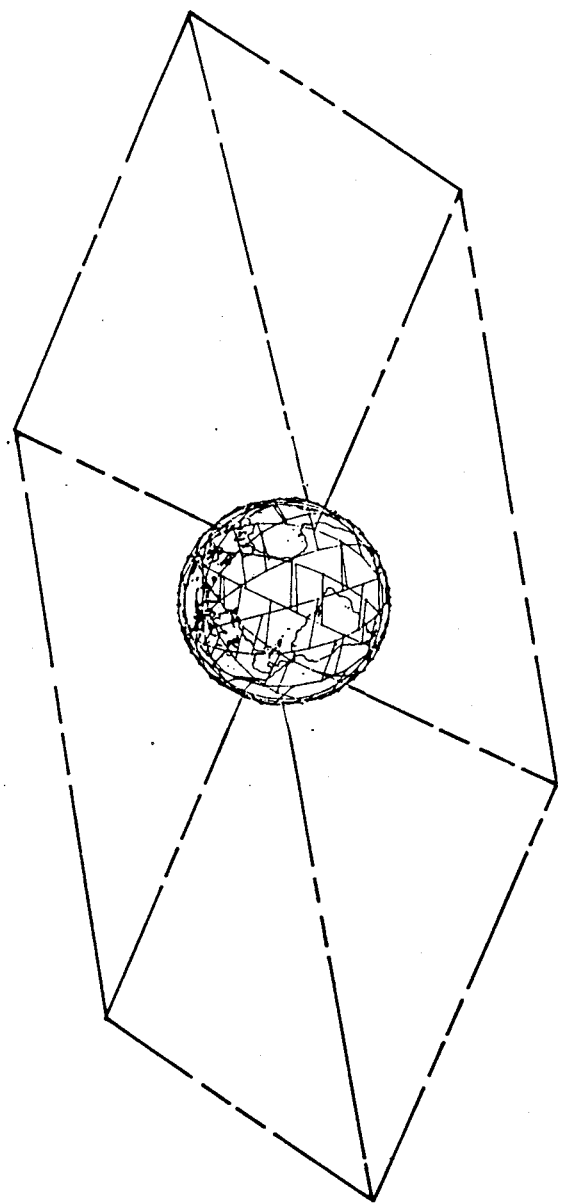
FIG. 1 schematically depicts a subnetwork of sensor nodes in high earth orbits.
Figure 2:
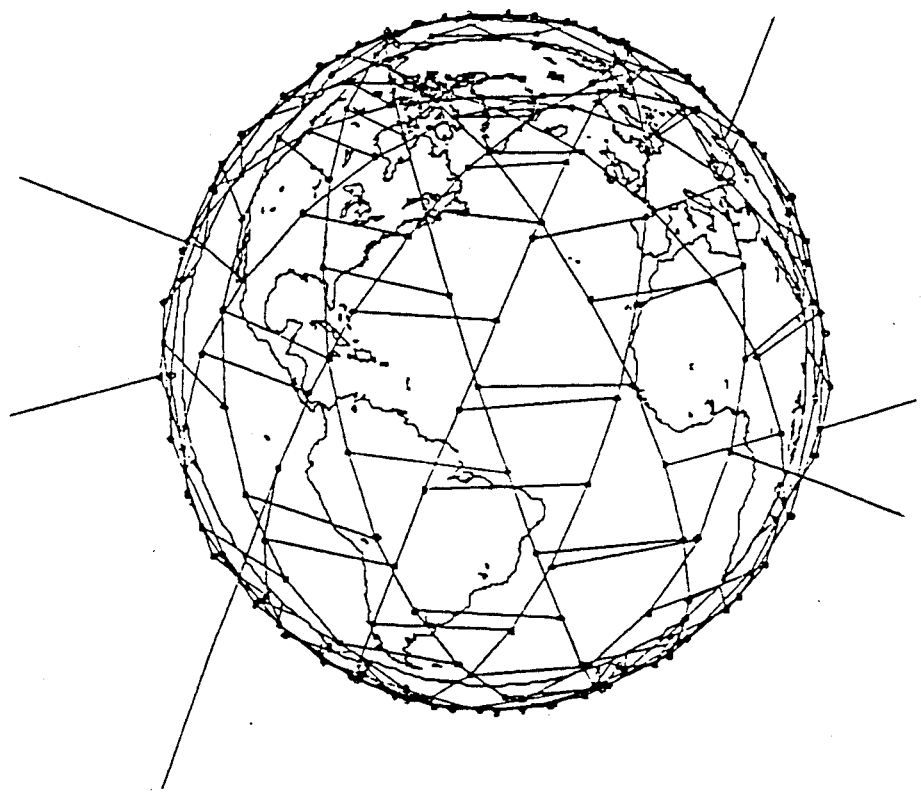
FIG. 2 schematically depicts a subnetwork of weapon nodes in low earth orbits.
Figure 3A:
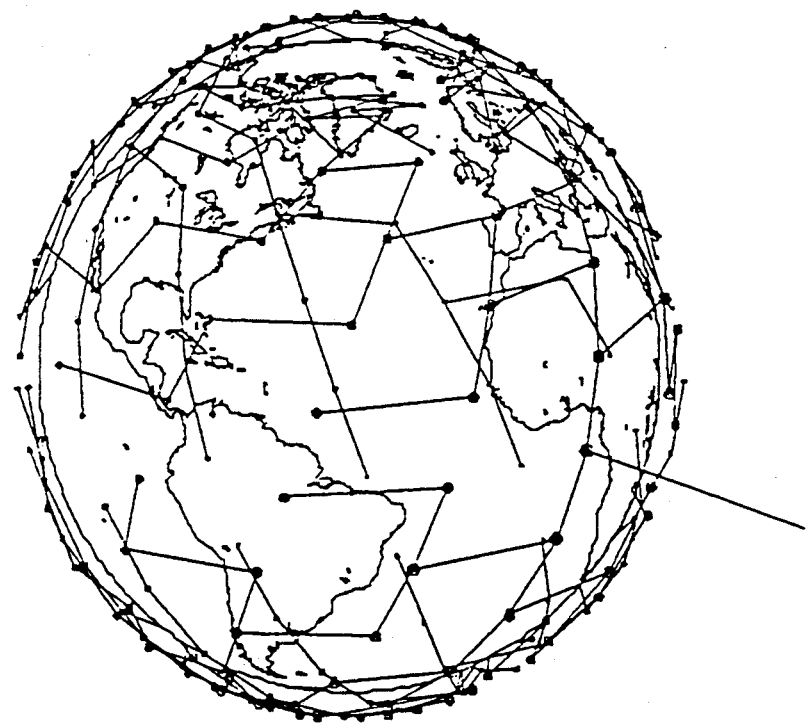
FIG. 3a schematically depicts in three dimensions routes of a constrained flood broadcast, and FIG. 3b schematically depicts those routes in a flat projection.
Figure 3B:
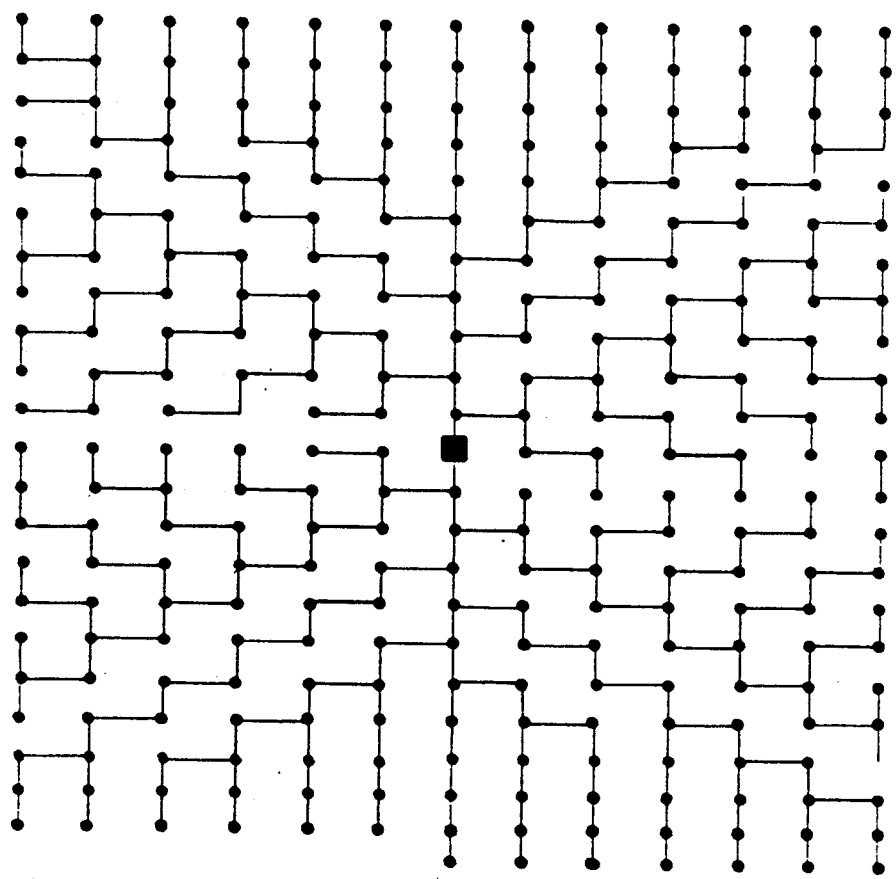
Figure 18:
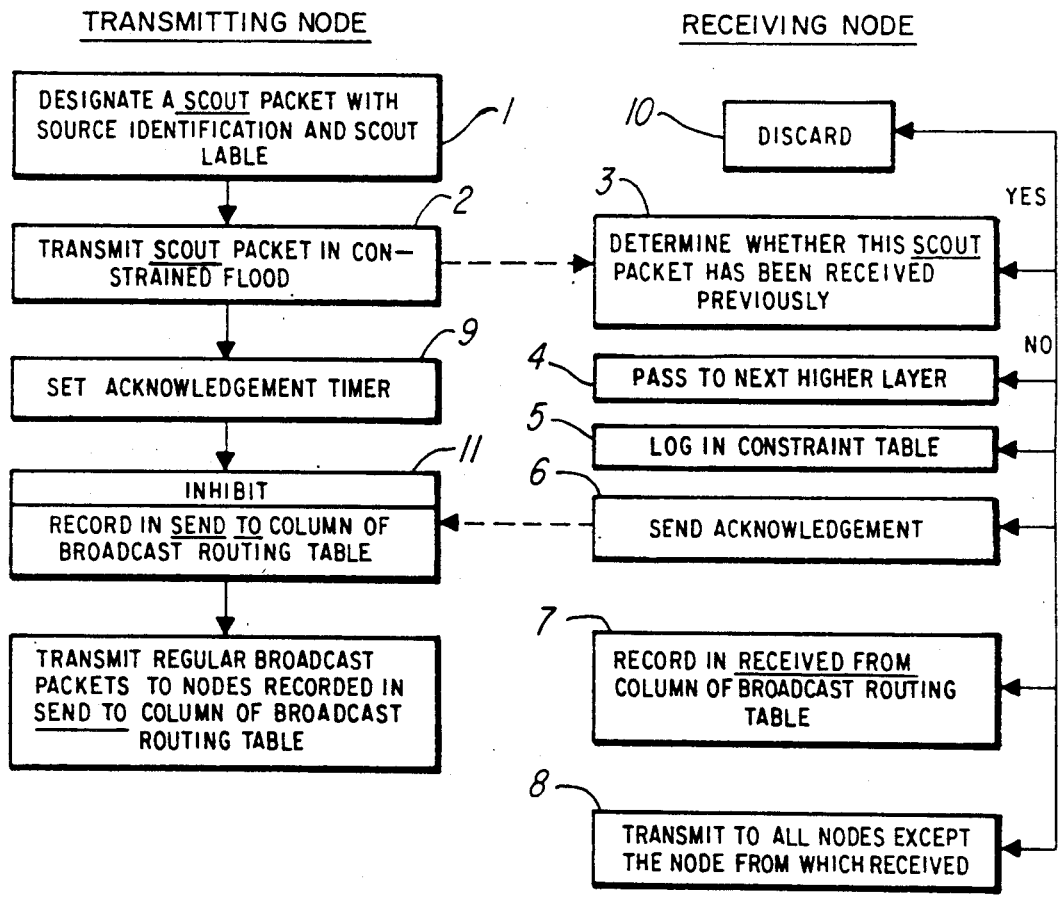
FIG. 18 is a flow chart of the overall operation.

With reference to FIG. 18, at predetermined intervals, a source node, such as one of the source nodes depicted in FIG. 1, designates a broadcast packet as a Scout packet (step 1) and transmits that packet in a constrained flood (step 2), not only to send the packet to all receiving nodes, e.g. the nodes depicted in FIG. 2, but also to establish the broadcast routes to those receiving nodes. FIG. 4 sets forth the program design language for the algorithm to determine whether it is time for a packet to be designated as a Scout packet. Each such Scout packet is identified by a Source Id, indicative of the source node, and a Scout Label, identifying the particular Scout packet from that source node.

At each receiving node, if the Scout packet has not been seen before by the node, as determined from the packet's Source Id and Scout Label (step 3), then the node accepts the Scout packet and passes it on to the next higher layer (step 4), logs the Scout packet in the node's constraint table (step 5), sends back an Ack Scout packet to the neighbor node that forwarded the Scout packet (step 6), enters identification of that neighbor node in the Received From column of the broadcast routing table indexed by Source Id and Scout Label (step 7), copies and forwards the Scout packet on all links except the link on which it arrived (step 8), and sets a timer, designated Ack Scout Timer, for receipt of acknowledgements of the Scout packet from the nodes to which the node has forwarded the Scout packet (step 9). The timer is set roughly to the longest round trip transmission time between the node and its neighbor nodes. If a reliable link service protocol is used, retransmission delay must also be included. If the receiving node has previously seen the Scout packet, as determined by finding the Source Id and Scout Label in the node's constraint table, then the node discards the Scout packet (step 10). The constraint table can be a memory look-up table. FIG. 5 sets forth the program design language for this. The Source Id and Scout Label are sufficient for proper acknowledgement of a Scout packet. Due to their brevity, Ack Scout packets may be piggybacked and redundantly transmitted for added reliability. FIG. 6 sets forth the program design language for the source node to generate the Scout packets.

Broadcast routes are extracted from Ack Scout packets and recorded as they are received by each node. When the Ack Scout Timer expires, the node enters in the Send To column of its broadcast routing table a list of its neighbor nodes from which it has received an Ack Scout packet (step 11), indexed by Source Id and Scout Label, and enters Null for those neighbor nodes from which it has not received an Ack Scout packet. FIG. 7 sets forth the program design language for this algorithm.

The same algorithm also works for the source node, which originates the flood packet, if the source node treats itself as a forwarding node and utilizes a null indication to indicate the incoming link so that the source node forwards the Scout packet on all of its links.

After the Ack Scout Timer expires at the source node, routes indexed by Source Id and Scout Label in the broadcast routing table are available for use. FIG. 8 presents the program design language for establishing these routes. Use of multiple Scout Labels allows the source node to send out another Scout packet without having to wait for the previous Scout packet to be acknowledged. As soon as a new set of routes is available, it becomes the active set of routes at the source node, but older sets of routes are still maintained by other nodes long enough for packets already in route to reach their destinations. By reusing a number of preallocated Scout Labels, one after another, the source node manages the multiple sets of routes in an orderly fashion.

In the forwarding phase, the source node sends out broadcast packets identified by its Source Id and a Scout Label, thereby signalling to receiving nodes that these packets are to be forwarded on the routes that were built from the Scout packet with the specified Scout Label. FIG. 9 is the program design language for the source node to generate and transmit these non-flood packets. Packets are copied and forwarded by nodes according to the routing information contained in the nodes' broadcast routing tables. Thus, each node uses the Source Id and Scout Label to look up entries in its Received From and Send To columns, discards packets that did not come from neighbors on its Received From list, and forwards the other packets to those of its neighbors that are on the Send To list associated with the Source Id and Scout Label of each respective packet. FIG. 10 presents the program design language for this.

This flood-and-forward routing algorithm has been coded, tested and evaluated in a high fidelity network simulation environment developed for studying communication networks. The network has six sensor nodes in a simple ring topology, of the type depicted in FIG. 1, and 299 other nodes in a brick wall topology of 13 rings, of the type depicted in FIG. 2. Sensor data are broadcast from sensor nodes to all other nodes on point-to-point links sized at 500 Kb/s each. The six sensor nodes generate a combined traffic load of 460 Kb/s. A comparison of performance and cost between flood-and-forward routing and constrained flooding has been made.

Figure 11:
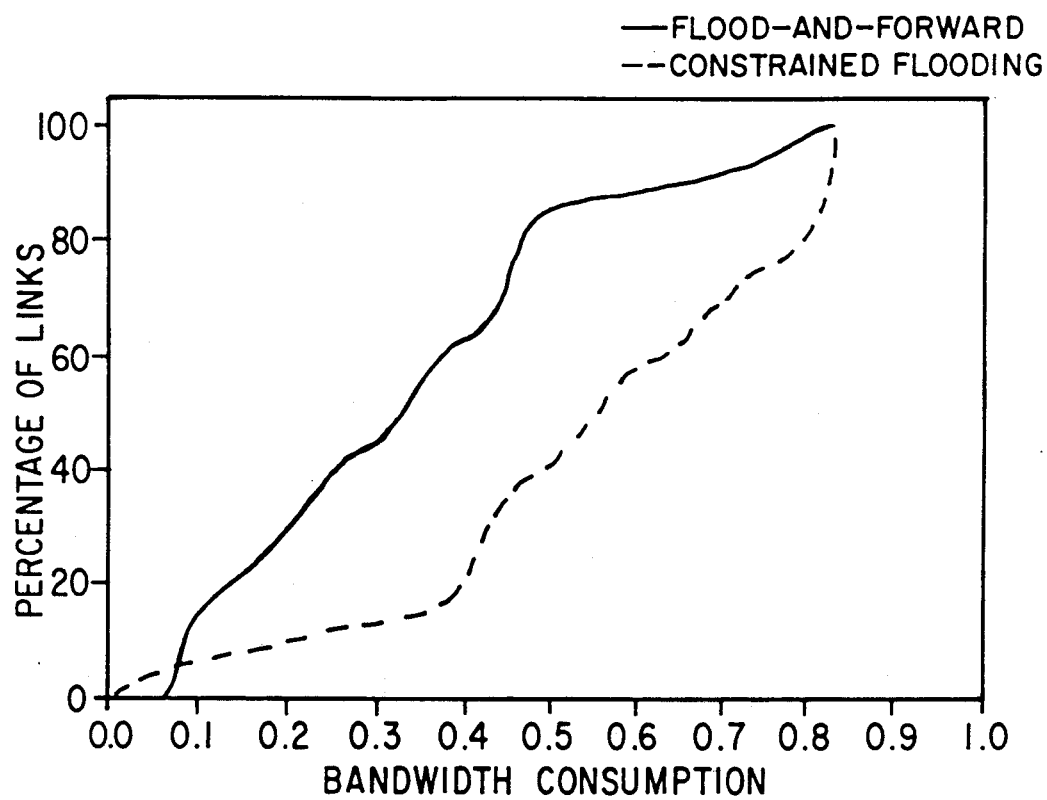
FIG. 11 graphically presents cumulative distribution function curves comparing bandwidth consumption in a transmission broadcast in accordance with the present invention and in a transmission broadcast in a constrained flood.

With the exception of Scout packets, packets in flood-and-forward routing are forwarded along branches of a spanning tree. For each non-flood broadcast, only one one-hop packet is generated per destination, thus achieving the optimal use of bandwidth. In FIG. 11, cumulative distribution function (CDF) curves for bandwidth consumption are shown with all links in the network included. A point on the CDF curve shows how many links have bandwidth consumption less than or equal to the corresponding value found on the x-axis. Since the network topology under evaluation has three links per node, the majority of links have their bandwidth consumption reduced in half when flood-and-forward routing is used. In general, the reduction factor is proportional to the number of links per node minus one.

Figure 12:
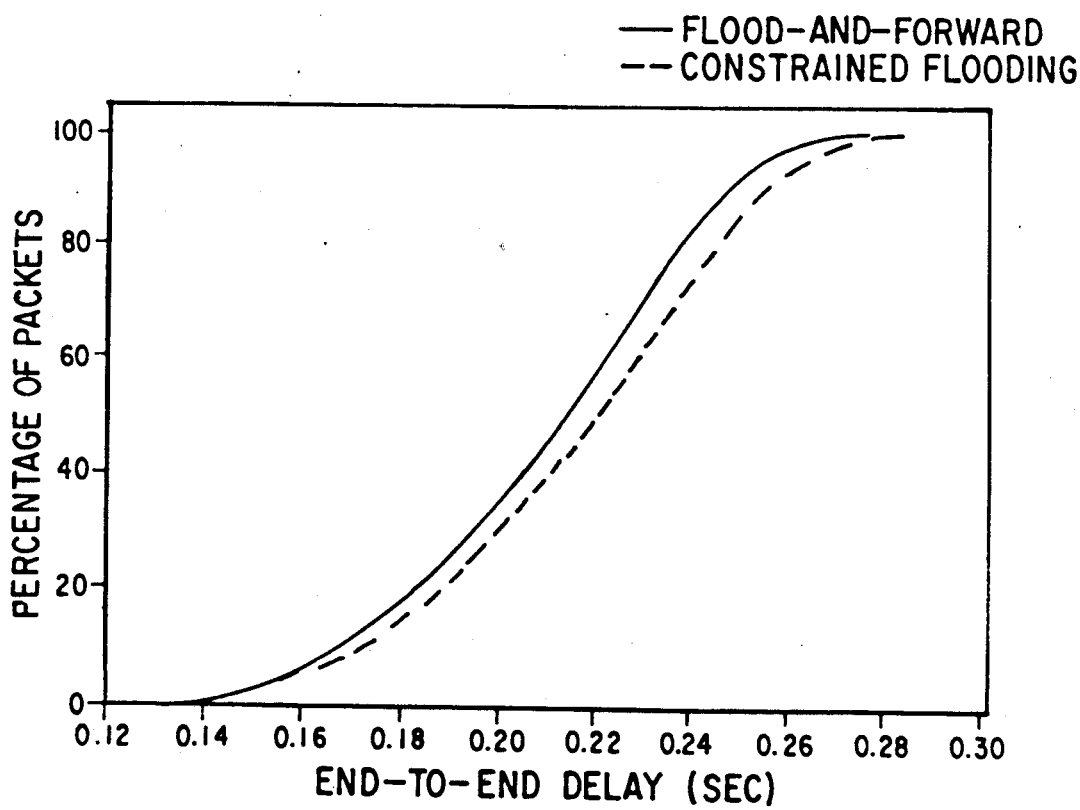
FIGS. 12 and 13 graphically compare transmission delays between a broadcast in accordance with the present invention and a broadcast utilizing a constrained flood.
Figure 13:
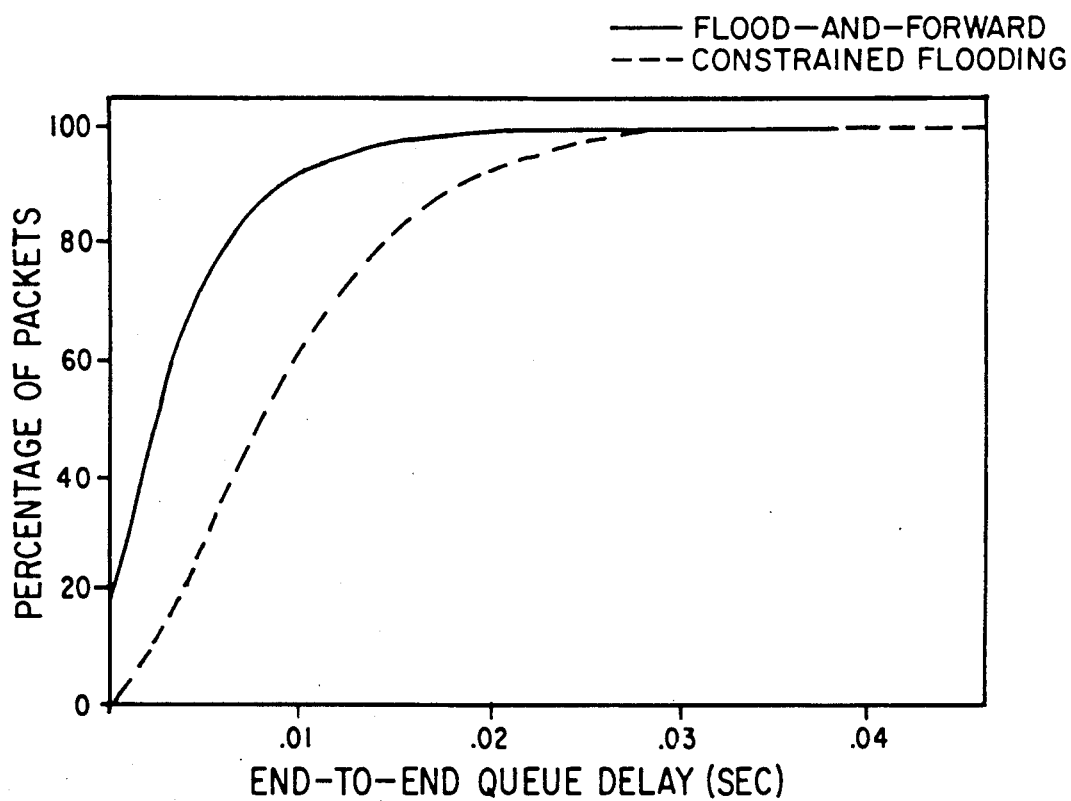

Packets in flood-and-forward routing are forwarded on routes selected by constrained flooding. However, since there are fewer packet duplicates, and thus less congestion and queue delay, end-to-end delay s better than that of constrained flooding. FIG. 12 shows CDF curves comparing the delay from broadcast source to all destinations utilizing the flood-and-forward technique of the present invention with constrained flooding. The smaller queue delay experienced by packets in flood-and-forward routing, as shown in FIG. 13, is a direct consequence of the optimal use of bandwidth.

Each source in flood-and-forward routing maintains multiple sets of routes to be able to adapt quickly to existing traffic conditions. For example, if Scout packets are generated at a rate of 10 Scout packets per second, new routes are available every 0.1 second. The rate of generation of Scout packets can be adjusted up or down to meet network requirements.

It takes some time for a Scout packet to propagate and reach all nodes, but the source node does not have to wait for feedback from the most distant node. Routes can be used almost as soon as neighbor nodes acknowledge the Scout packet. The wait period is approximately twice the longest hop delay in the network, so as to prevent non-flood packets from catching up with Scout packets. If topological changes cause some route segment to be broken, the network will recover from any packet loss as soon as the wait period for a new Scout packet ends, e.g., within 0.1 seconds.

Broadcast survivability is a measure of how well a routing algorithm manages to deliver a broadcast packet in face of packet errors. Unfortunately, for any broadcast routing scheme employing a spanning tree, loss of a forwarded packet due to packet errors may result in a whole subtree of destinations not receiving the broadcast.

The effect of packet errors on broadcast survivability can be analytically projected for such routing schemes. For example, for a perfectly balanced binary tree, i.e., three links per node, let p be the packet error rate, and $2^N - 1$ the number of nodes. Then, the average number of nodes not receiving a broadcast is given by:

$$\sum_{i=0}^{N-1} (1-p)^i p (2^N - 2^i)$$

Figure 14:
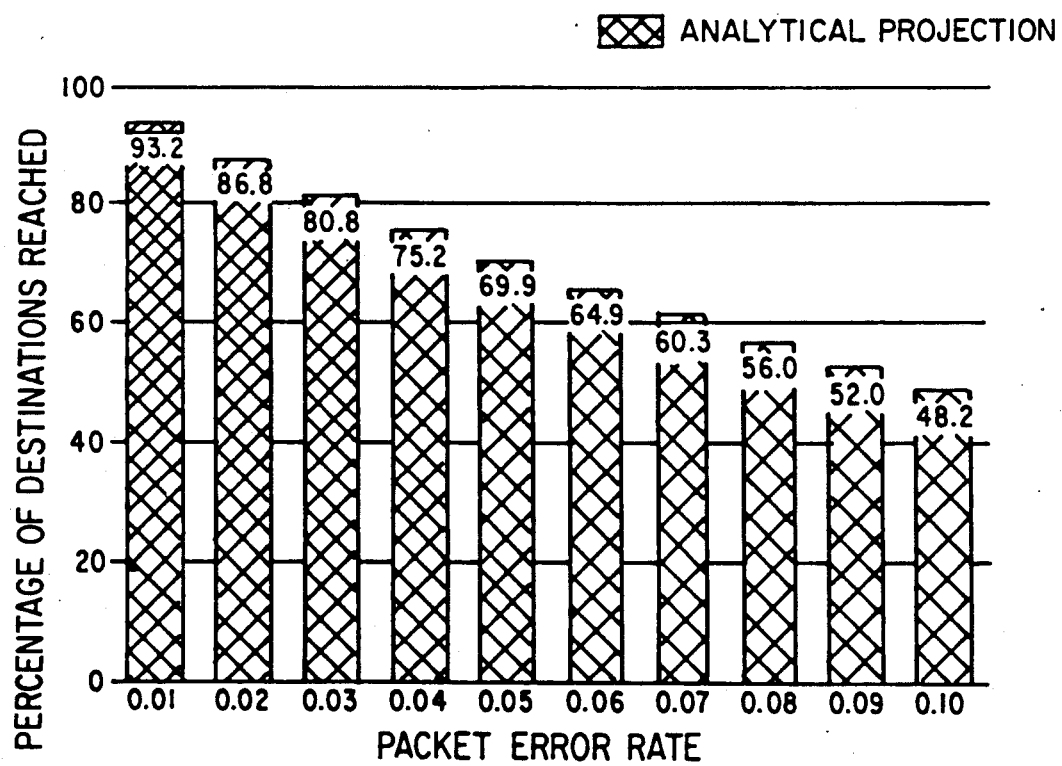
FIGS. 14, 15, and 16 graphically depict broadcast survivability in a transmission in accordance with the present invention.
Figure 15:
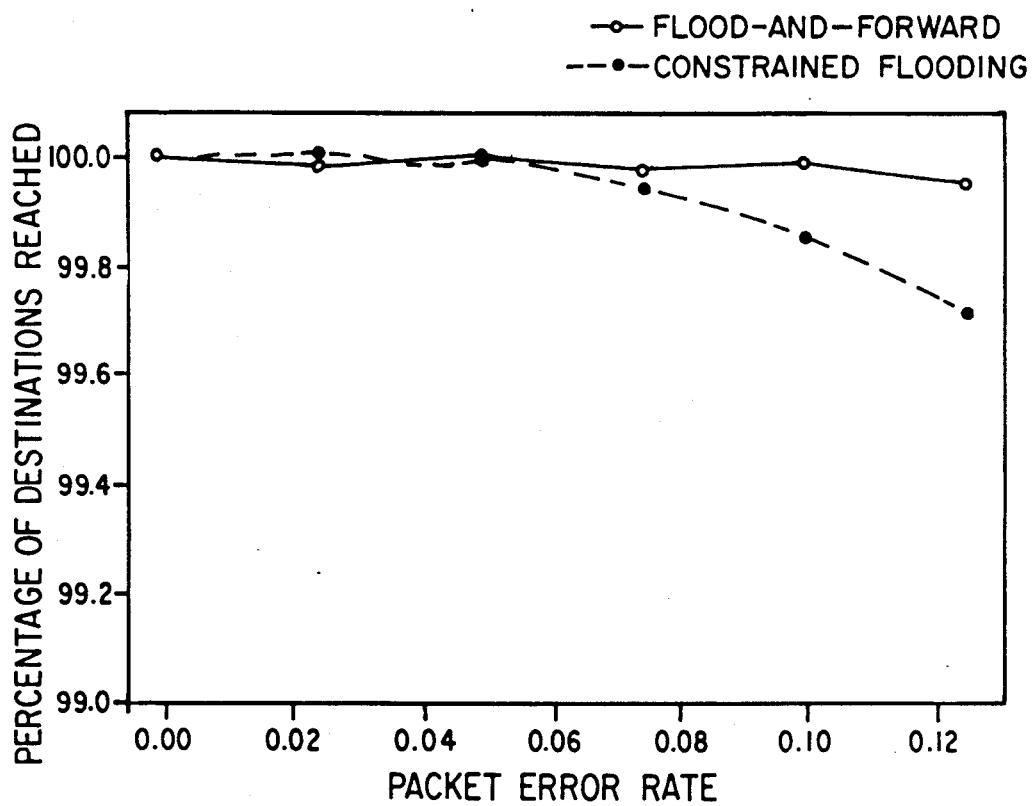
Figure 16:
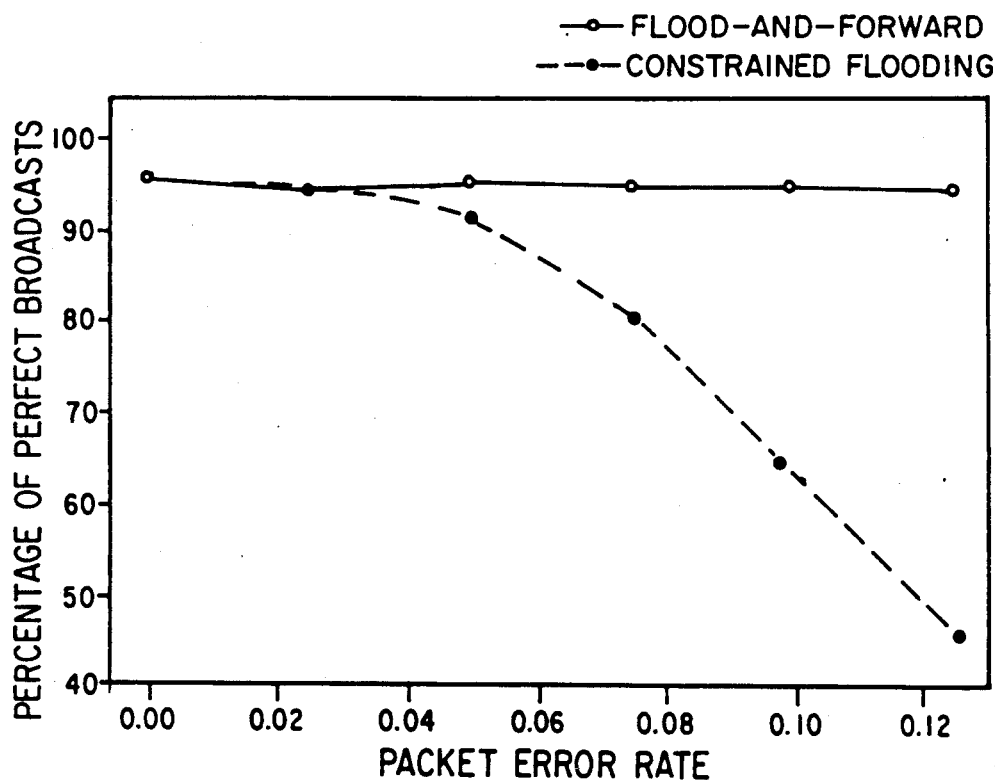
Figure 17:
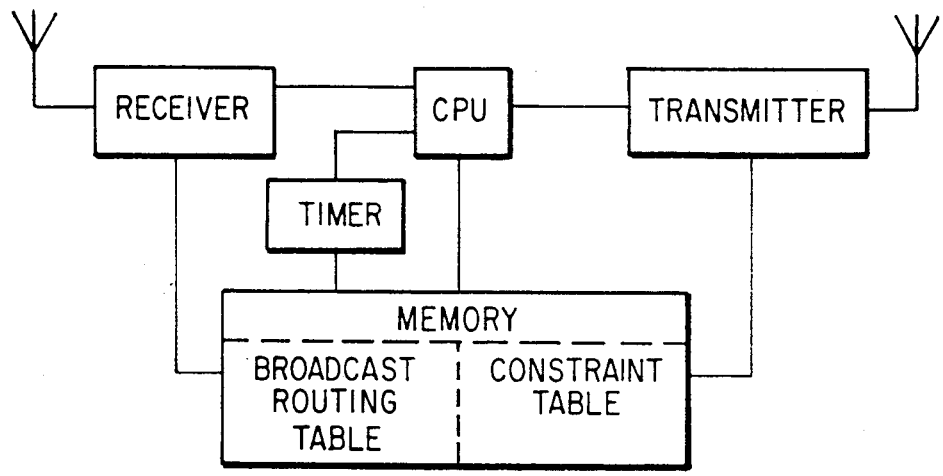
FIG. 17 is a block diagram depicting the general configuration of a node.

The percentage of nodes receiving a broadcast is derived from this equation and plotted as a function of the packet error rate in FIG. 14. The projection appears to show disappointing broadcast survivability for flood-and-forward routing; however, when flood-and-forward routing is simulated with a reliable link service protocol, which implements hop-by-hop acknowledgement and retransmission, the broadcast quality is vastly improved to about the same level as that of constrained flooding, as depicted in FIG. 15. For applications which depend critically on the broadcast being received by every node, flood-and-forward routing guarantees a very high probability of perfect delivery. For a 10% packet error rate, FIG. 16 shows 98.52% perfect delivery by flood-and-forward routing, as contrasted with 66.58% perfect delivery by constrained flooding.

The true strength of flood-and-forward routing is that it achieves its superb performance with very little cost. A Scout packet is just a data packet spearheading a wave of other data packets, and routes are generated as needed by each source. A Scout packet will not be sent if there is no traffic, but if the routes are outdated, the first data packet out must be a Scout packet. The overhead in Ack Scout packets is insignificant, and there is no computation and maintenance of spanning trees.

In flood-and-forward routing, the size of the constraint table is proportional to the Scout packet generation rate (which is comparatively very low), time for Scout packets to live, and 0 the number of sources. For a traffic rate of 50,000 pkts/sec and a Scout packet rate of 10 packets/sec., this represents a size reduction of 5000 to 1. Similarly, the size of the broadcast routing table is proportional to the Scout packet generation rate, the time for routes to live, the number of sources, and the number of links per node.

What is claimed is:

1. In a communication network having a plurality of communication nodes including at least one source node and a plurality of receiving nodes, the source node transmitting data packets to all the receiving nodes in a broadcast transmission mode, a method of operation comprising:

(a) at the source node, periodically designating one of the data packets as a scout packet for establishing broadcast routes to the receiving nodes; incorporating into the scout packet a source identification, indicative of the identification of the source node, and a scout label, indicative of the particular scout packet; transmitting that scout packet to all the receiving nodes in a constrained flood broadcast transmission; and initiating a first time interval having a predetermined duration for receipt of acknowledgements of receipt of the scout packet;

(b) at each receiving node, maintaining a constraint table of the source identifications and scout labels of received scout packets and a broadcast routing table for received scout packets, said broadcast routing table being indexed by source identifications and scout labels; receiving the transmitted scout packet; determining whether the source identification and scout label of the received scout packet are in the constraint table; if the source identification and scout label of the received scout packet are in the constraint table, then discarding the scout packet; and if the source identification and scout label of the received scout packet are not in the constraint table, then (1) transmitting an acknowledgement of the scout packet to the node from which the scout packet was received, (2) transmitting the scout packet to other receiving nodes in accordance with the constrained flood broadcast transmission, (3) initiating a second time interval having a predetermined duration for receipt of acknowledgements of receipt of the scout packet by said other receiving nodes, (4) recording the source identification and scout label of the scout packet in the constraint table, and (5) recording in a "received column" in the broadcast routing table the identification of the node from which the scout packet was received, and (6) recording in a "send to" column in the broadcast routing table the identification of the other receiving nodes from which an acknowledgement of receipt of the scout packet is received during the second time interval;

(c) at the source node, receiving acknowledgements of receipt of transmitted scout packets; incorporating into non-scout data packets the source identification and scout label of the scout packet for which the first time interval has most recently expired; and transmitting the non-scout data packets to those nodes from which an acknowledgement has been received of receipt of the scout packet having the source identification and scout label that are incorporated into such non-scout data packet; and (d) at each receiving node, receiving non-scout data packets; determining whether the "received from" column of the broadcast routing table has recorded therein as the node from which said receiving node received the scout packet having the same source identification and scout label as are incorporated in the received non-scout data packet the identification of the node from which said each receiving node received the non-scout-data packet; if the "received from" column of the broadcast routing table has recorded as the node from which said receiving node received the scout packet having the same source identification and scout label as are incorporated in the received non-scout data packet the node from which the receiving node received the non-scout data packet, then transmitting the non-scout data packet to those receiving nodes recorded in the "send to" column of the broadcast routing table for that scout packet; and if the "received from" column of the broadcast routing table does not have recorded as the node from which said receiving node received the scout packet having the same source identification and scout label as are incorporated in the received non-scout data packet the node from which the receiving node received the non-scout data packet, then discarding the non-scout data packet.

2. A method as claimed in claim 1, wherein each receiving node initiates the second time interval to have a time substantially equal to the longest round trip transmission time between the receiving node and the other receiving nodes to which said receiving node transmits the scout packet.

3. A method as claimed in claim 1, wherein each receiving node transmits the source identification and scout label of the received scout packet as the acknowledgement.

* * * * *